United States Patent Office 3,661,868
Patented May 9, 1972

3,661,868
FLOCCULANT
Benny G. Barron, Lake Jackson, Tex., assignor to The Dow Chemical Company, Midland, Mich.
No Drawing. Filed May 1, 1970, Ser. No. 33,925
Int. Cl. C08f 15/02
U.S. Cl. 260—80.3 N                                    6 Claims

ABSTRACT OF THE DISCLOSURE

In the inverse suspension polymerization of a mixture of acrylamide and an N-(dialkylaminoalkyl)acrylamide or methacrylamide, the resulting cationic copolymer has superior flocculating capacity when there is present in the mixed monomers a small amount of an N-(dialkylaminoalkyl) - 3 - (dialkylaminoalkylamino)propionamide. This additive preferably corresponds in its carbon skeleton and nitrogen atom substituents to the cationic monomer.

BACKGROUND OF THE INVENTION

This invention concerns a new and improved flocculant and a process for making it. More particularly, it concerns an improved cationic polyacrylamide and the use of a polyamino substituted saturated amide of related structure as an additive in the polymerization process.

It is known that copolymers of acrylamide and another ethylenically unsaturated monomer having a cationic substituent are effective flocculating agents for settling sewage and similar aqueous wastes containing suspended particles. In particular, cationic polymers obtained by copolymerizing acrylamide or methacrylamide with an N-(dialkylaminoalkyl)acrylamide or corresponding methacrylamide have been disclosed as efficient flocculants, for example, by Colwell et al., U.S. Pat. 3,014,896 and by Suen et al., U.S. Pat. 3,171,805. It is also known that polymers and copolymers of acrylamide and other such water-soluble monomers are conveniently prepared in easily dispersible bead form by an inverse suspension polymerization method described by Friedrich et al., U.S. Pat. 2,982,749. This method comprises forming a suspension of aqueous monomer solution in a liquid hydrocarbon or other inert hydrophobic organic solvent and subjecting the suspension or emulsion to heat-polymerizing conditions whereby a corresponding suspension of polymer beads is formed, the size of the beads having been predetermined by controlling the size of the suspended globules of aqueous monomer solution.

SUMMARY OF THE INVENTION

It has now been found that cationic bead copolymers made by the process described above have unexpectedly superior flocculating properties when they are prepared in the presence of a saturated polyamino compound having a structure analogous to that of the cationic comonomer. More specifically, it has been discovered that in the inverse suspension polymerization method described above wherein a suspension of an aqueous solution of a monomer mixture containing 95–50 mole percent of acrylamide, or a mixture of acrylamide with up to 25 mole percent of methacrylamide, and 5–50 mole percent of a cationic substituted acrylamide of the formula

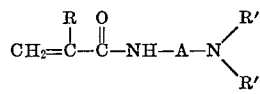

where R is hydrogen or a methyl radical, each R' is a methyl or ethyl radical, and A is an alkylene radical of 1–3 carbon atoms, in an inert hydrophobic organic solvent and heat-polymerizing the suspended monomer mixture in the presence of a polymerization initiator, a bead polymer product having improved flocculating activity is obtained when there is present in the solution of mixed monomers about 0.3–7 grams per gram mole of total monomers of a cationic additive polyamino compound of the formula

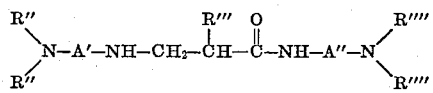

wherein each R" and R"" is independently a methyl or ethyl radical, R'" is hydrogen or a methyl radical, and A' and A" are each an alkylene radical of 1–3 carbon atoms. Preferably, in the above two formulas, R=R'", R'=R"=R"", and A=A'=A", so that the cationic monomer and the cationic additive compound correspond in their molecular structures.

DETAILED DESCRIPTION

It is most preferred that the two comonomers are acrylamide and N-[(2-dimethylamino)ethyl]methacrylamide and the cationic additive compound corresponds to the cationic monomer, being the compound N-[(2-dimethylamino)ethyl] - 3 - {[2 - (dimethylamino)ethyl]amino}-2-methylpropionamide.

The mode of action of the polyamino additive is not fully understood, but the similarity in molecular structure between it and the cationic monomer suggests that the enhancement of activity results from some kind of association or combination of the additive with the cationic polymer product. Best results are obtained when the cationic additive is present in the polymerization process in a quantity of 1.5–5 grams per gram mole of total monomers.

Surprisingly, the present process offers no advantage in conventional solution polymerization and cationic acrylamide copolymers made by that procedure in the additional presence of a cationic additive compound as defined herein show no significant additional flocculating activity. Similarly, a cationic additive has no apparent effect on their activity as flocculants of corresponding cationic methacrylate copolymers even though made by the inverse suspension polymerization process.

Illustrative cationic monomers include the compounds:

N-(dimethylaminomethyl)acrylamide
N-(diethylaminomethyl)methacrylamide
N-[2-(dimethylamino)ethyl]acrylamide
N-[2-(diethylamino)ethyl]methacrylamide
N-[3-(dimethylamino)propyl]acrylamide
N-[2-(diethylamino)propyl]methacrylamide Representative cationic polyamino additive compounds are those which can be made, literally as well as figuratively, by adding an appropriate dialkylaminoalkyl primary amine to the olefinic double bond in a cationic monomer as defined above. Preferably, but not necessarily, the primary amine is that corresponding to the dialkylaminoalkyl substituent on the amide nitrogen atom of the cationic monomer. For example, by the addition reaction of N,N-dimethylethylenediamine with N-[2-(dimethylamino)ethyl]methacrylamide, there is obtained N-[2-(dimethylamino)ethyl] - 3 - {[2 - (dimethylamino)ethyl]amino}-2-methylpropionamide which has the structure:

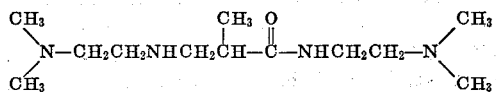

Other such cationic additive compounds which are operative in the invention are those obtained by addition to the olefinic bond of a cationic monomer as described above of one of the following diamines:

N,N-diethylethylenediamine
N,N-dimethyl-1,3-propanediamine
N,N-dimethylpropylenediamine
N,N-diethylmethanediamine
N,N-dimethylmethanediamine The cationic monomers and cationic polyamino compounds described above can be prepared by any of several known methods. For example, the substituted acrylamides and methacrylamides can be made by reacting the acid chloride with the desired dialkylated diamine in the usual way. Another convenient method which provides good yields of the N-substituted cationic acrylamide comprises preparing the Michael adduct by reacting acrylamide or methacrylamide with an equivalent of the diamine at 100–130° C., then thermally decomposing the adduct at 140–220° C., preferably at 180–200° C. to drive off water. Yields of 70% or better of the N-dialkylaminoalkylacrylamide are obtained in this way.

An advantageous procedure for making both the cationic monomer and the corresponding saturated polyamino compound comprises reacting the acrylic acid or ester with an excess of the dialkylated diamine to make the saturated polyamino propionamide, then decomposing that compound with heat and acid to produce the cationic acrylamide. Example A is illustrative.

EXAMPLE A

A mixture of 400.5 g. of methyl methacrylate, 4 g. of p-methoxyphenol, and 881.6 g. of N,N-dimethylethylenediamine was heated at its reflux temperature for 15 hours. Excess diamine and methanol were distilled from the reaction mixture under reduced pressure. The residual product was crude N-[2-(dimethylamino)ethyl]-3-{[2-(dimethylamino)ethyl]amino}-2-methylpropionamide.

A portion of 48.9 g. portion of the product plus 0.2 g. of p-methoxyphenol was cooled to 10° C. and 38.9 g. of 37.5% hydrochloric acid was added dropwise while maintaining the temperature below 25° C. The resulting dihydrochloride salt was then heated at 160–200° C. at 2 mm. Hg while distilling off volatile byproducts to obtain 87.7% of the theoretical quantity of N-[(2-dimethylamino)ethyl]methacrylamide.

EXAMPLE 1

A copolymer of 80 mole percent acrylamide and 20 mole percent N-(2-dimethylaminoethyl)methacrylamide was prepared by the inverse emulsion polymerization technique. The continuous oil phase consisted of 140 ml. of deodorized kerosene and 6.5 g. of Arquad 2HT-100, a dimethyl dihydro tallow ammonium chloride. The aqueous monomer phase consisted of the following:

|   | G. |
|---|---|
| N-(2-dimethylaminoethyl)methacrylamide | 31.2 |
| Acrylamide | 56.8 |
| $K_2S_2O_8$ | 0.016 |
| Tert-butyl hydroperoxide | 0.032 | dil. HCl to form a 70% monomer solution at pH 5–5.5. Nitrogen was bubbled through both solutions to remove dissolved oxygen, then the solutions were mixed and homogenized to give a water-in-oil emulsion having a disperse phase particle size of about one micron. Polymerization was initiated by heating to 45–50° C. while maintaining a slow bubbling of nitrogen and moderate agitation. The heat of polymerization caused a temperature increase of 50–60° C., thereafter the emulsion was held at 70–75° C. for about 30 minutes to complete the polymerization. The product was a stable emulsion of easily dispersible water-soluble polymer particles.

EXAMPLES 2–6

The procedure of Example 1 was repeated except that from one to 15 percent of the starting N-[2-(dimethylamino)ethyl]methacrylamide was replaced by an equal weight of N -[2 - (dimethylamino)ethyl] - 3 - {[2-(dimethylamino)ethyl]-amino} - 2 - methylpropionamide. The polymerized products were stable emulsions as before.

All of the above polymerized products were tested for flocculating efficiency by measuring the dewatering rate of digested sewage sludge after treatment with a known quantity of product. This test was conducted by adding 150 ml. of water containing 0.01125 g. of polymer to 150 ml. of digested sludge containing 7.5 g. of solids. The sludge was that obtained from anerobic digestion of sewage. The mixture was stirred for about 10 seconds and then was transferred to a suction filter equipped with two sheets of 12.5 cm. No. 40 Whatman filter paper. The dewatering rate was measured by the filtrate volumes collected at 10, 20, 30, 60, and 120 seconds at 15.5 inches of mercury. The flocculant weight used represents 0.15% based on the weight of solids. The drainage data is listed in the following table.

TABLE

| Flocculant, Example No. | Additive, g./mole [1] | Dewatering rates, ml. of filtrate ||||| 
|---|---|---|---|---|---|---|
| | | 10 sec. | 20 sec. | 30 sec. | 60 sec. | 120 sec. |
| 1 | 0 | 48 | 62 | 72 | 94 | 123 |
| 2 | 0.31 | 65 | 90 | 106 | 139 | 186 |
| 3 | 2.5 | 80 | 110 | 131 | 171 | 225 |
| 4 | 3.1 | 110 | 160 | 195 | 230 | 246 |
| 5 | 4.05 | 100 | 140 | 170 | 220 | 240 |
| 6 | 4.68 | 80 | 110 | 135 | 185 | 235 |

[1] Based on moles of total monomers present.

I claim:

1. In the process for making a cationic acrylic amide bead copolymer which comprises foarming a water-in-oil suspension of an aqueous solution of a monomer mixture of 95–50 mole percent of acrylamide, or mixture of acrylamide with up to 25 mole percent of methacrylamide, and 5–50 mole percent of a cationic substituted acrylamide of the formula

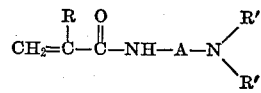

where R is hydrogen or a methyl radical, each R' is a methyl or ethyl radical, and A is an alkylene radical of 1–3 carbon atoms, in an inert hydrophobic liquid organic dispersion medium and heat-polymerizing the suspended monomer mixture in the presence of a polymerization initiator, the improvement of incorporating in said monomer mixture solution about 0.3–7 grams per gram mole of total monomers of an additive compound of the formula

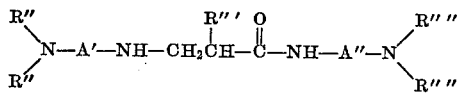

wherein each R'' and R'''' is independently a methyl or ethyl radical, R''' is hydrogen or a methyl radical, and each of A' and A'' is an alkylene radical of 1–3 carbon atoms.

2. The process of claim 1 wherein R=R''', $$R'=R''=R''''$$

and A=A'=A''.

3. The process of claim 2 wherein R, R', R'', R''', and R'''' are methyl radicals and A, A', and A'' are ethylene radicals.

4. The process of claim 2 wherein 1.5–5 grams of the additive compound are incorporated per gram mole of total monomers.

5. The process of claim 3 wherein the monomer mixture consists of acrylamide and N-[2-(dimethylamino)ethyl]-methacrylamide.

6. The cationic acrylic amide bead copolymer product of the process of claim 1.

References Cited

UNITED STATES PATENTS

| | | | |
|---|---|---|---|
| 2,982,749 | 5/1961 | Friedrich et al. | 260—23 |
| 3,014,896 | 12/1961 | Colwell et al. | 260—80.3 |
| 3,171,805 | 3/1965 | Suen et al. | 210—54 |

JAMES A. SEIDLECK, Primary Examiner

S. M. LEVIN, Assistant Examiner

U.S. Cl. X.R.

260—80.73, 561 A, 561 N